(12) United States Patent
Mizuno et al.

(10) Patent No.: US 7,866,227 B2
(45) Date of Patent: Jan. 11, 2011

(54) VEHICULAR POWER TRANSMISSION SYSTEM

(75) Inventors: Kinya Mizuno, Saitama (JP); Yasushi Fujimoto, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 11/526,771

(22) Filed: Sep. 26, 2006

(65) Prior Publication Data

US 2007/0074593 A1 Apr. 5, 2007

(30) Foreign Application Priority Data

Sep. 30, 2005 (JP) ............................. 2005-287983

(51) Int. Cl.
*F16H 3/08* (2006.01)
(52) U.S. Cl. ........................................... 74/331; 74/330
(58) Field of Classification Search ............ 74/329–331
See application file for complete search history.

(56) References Cited

U.S. PATENT DOCUMENTS

| | | | | |
|---|---|---|---|---|
| 4,736,809 A | * | 4/1988 | Kumazawa | ................ 180/339 |
| 4,748,869 A | * | 6/1988 | Ohtsuka | ..................... 475/54 |
| 5,249,475 A | * | 10/1993 | McAskill | ..................... 74/331 |
| 6,494,110 B2 | * | 12/2002 | Hatakeyama | ................ 74/331 |
| 2004/0025630 A1 | | 2/2004 | Hori et al. | |

FOREIGN PATENT DOCUMENTS

| | | | |
|---|---|---|---|
| EP | 1355086 A2 | * | 10/2003 |
| JP | 57-42244 U | | 3/1982 |
| JP | 04-262163 A | | 9/1992 |
| JP | 7-195949 A | | 8/1995 |
| JP | 2001-180310 A | | 7/2001 |
| JP | 2002-357267 A | | 12/2003 |
| JP | 2005-287983 A | | 10/2005 |

* cited by examiner

*Primary Examiner*—David D Le
*Assistant Examiner*—Derek D Knight
(74) *Attorney, Agent, or Firm*—Birch, Stewart, Kolasch & Birch, LLP (57) ABSTRACT

A transmission M of a vehicular power transmission system has a first shifting part and a second shifting part which shift a power of an internal combustion engine, a first shift clutch transmitting and interrupting the power to the first shifting part, and a second shift clutch transmitting and interrupting the power to the second shifting part. A start clutch transmitting and interrupting the power to the first shift clutch and the second shift clutch is constructed of a centrifugal clutch C having a clutch shoe. The resulting configuration provides a vehicular power transmission system which has excellent efficiency of power transmission and durability, as well as being capable of being manufactured at low cost, and being capable of relieving a start shock.

13 Claims, 5 Drawing Sheets

VEHICULAR POWER TRANSMISSION SYSTEM

CROSS-REFERENCE TO RELATED APPLICATION

The present application claims priority under 35 U.S.C. §119 to Japanese Patent Application No. 2005-287983, filed Sep. 30, 2005, the entire contents of which are hereby incorporated by reference.

BACKGROUND OF THE INVENTION

1. Field of the Invention

The present invention relates to a vehicular power transmission system provided with a transmission, the vehicular power transmission system shifting gear steps by a first shift clutch and a second shift clutch to which a power of an engine is transmitted.

2. Description of Background Art

There has been known a transmission of a vehicular power transmission system having a first shift clutch and a second shift clutch to which a power of an engine is transmitted, the shift clutches shifting gear steps (For instance, see JP-A No. 262163/1992, and JP-A No. 357267/2002).

A power of an engine is gradually transmitted to a transmission at start of a vehicle to relieve a start shock for smoothly starting the vehicle. When a fluid type torque converter is used for this, efficiency of power transmission in the torque converter is not always high, so that transmission loss can cause an increase in cost. In addition, when hydraulic clutches transmitting the power by friction of clutch plates are used as a first shift clutch and a second shift clutch which shift gear steps, the clutches are controlled to be in the partial clutch engagement state at start to relieve a start shock for permitting smooth start. The clutch plates causing a friction force are slidably contacted with each other to hasten exhaustion of the expensive hydraulic clutches.

SUMMARY AND OBJECTS OF THE INVENTION

The present invention has been made in view of such circumstances. An object of the present invention is to provide a vehicular power transmission system in which a first shift clutch and a second shift clutch to which a power of an engine is transmitted shift gear steps, the vehicular power transmission system being excellent in efficiency of power transmission and durability, and being capable of being manufactured at low cost and of relieving a start shock. Another object of the invention is to make an engine and a transmission compact. Still another object of the invention is to reduce the weight of the vehicle power transmission system by shortening an input shaft requiring strength for disposition of a first shift clutch and a second shift clutch in such a manner that the center of gravity of heavy parts such as a first shift clutch and a second shift clutch can be close to a supporting member. A further object of the invention is to improve making the operating response of the first shift clutch and the second shift clutch uniform.

According to a first aspect of the present invention, a vehicular power transmission system is provided with a transmission, the transmission having a first shifting part and a second shifting part which shift a power of an engine, a first shift clutch transmitting and interrupting the power to the first shifting part, and a second shift clutch transmitting and interrupting the power to the second shifting part, in which the first shift clutch and the second shift clutch shift gear steps of the first shifting part and gear steps of the second shifting part. The vehicular power transmission system includes a start clutch transmitting and interrupting the power to the first shift clutch and the second shift clutch, the start clutch being a centrifugal clutch having a centrifugal weight controlling the intermittent state by a centrifugal force in accordance with an engine rotational speed.

The power of the engine is transmitted to the first shift clutch and the second shift clutch and the first shifting part and the second shifting part via the centrifugal clutch changed from the disconnected state through the partial clutch engagement state to the connected state since the intermittent state is controlled by the centrifugal weight operated by the operation of the centrifugal force.

According to a second aspect of the present invention, the centrifugal clutch is disposed on an output shaft of the engine, the first shift clutch and the second shift clutch are disposed on an input shaft of the transmission arranged in parallel with the output shaft, and the first shift clutch and the second shift clutch are arranged in positions overlapped with the centrifugal clutch, seen in an axial direction of the input shaft.

The centrifugal clutch having a relatively large diameter, the first shift clutch, and the second shift clutch are arranged to be overlapped with each other, seen in the axial direction. The axle base between the output shaft and the input shaft can be smaller.

According to a third aspect of the present invention, the first shift clutch and the second shift clutch are arranged between a housing rotatably supporting the input shaft and the centrifugal clutch in the axial direction.

The first shift clutch and the second shift clutch which have a relatively large weight can be arranged to be closer to the housing than the centrifugal clutch. The center of gravity of heavy parts such as the first shift clutch and the second shift clutch can be close to the housing as a supporting member.

According to a fourth aspect of the present invention, the first shift clutch and the second shift clutch constructed of hydraulic clutches having hydraulic chambers are arranged back to back so that the hydraulic chamber of the first shift clutch and the hydraulic chamber of the second shift clutch are close to each other in the axial direction.

The first shift clutch and the second shift clutch are arranged back to back so that their hydraulic chambers can be close to each other. The difference in length between oil paths guiding working fluid to the hydraulic chambers of the first shift clutch and the second shift clutch can be smaller.

According to a fifth aspect of the present invention, a transmission mechanism transmitting the power from the centrifugal clutch to the first shift clutch and the second shift clutch is arranged between the first shift clutch and the second shift clutch in the axial direction.

The transmission path lengths of the power from the centrifugal clutch to the first shift clutch and the second shift clutch can be equalized. The equal power can be transmitted to both the first shift clutch and the second shift clutch.

The invention according to the first aspect of the present invention, a centrifugal clutch excellent in efficiency of power transmission at relatively low cost is used as a start clutch. The vehicular power transmission system in which the first shift clutch and the second shift clutch to which the power of the engine is transmitted shift gear steps is excellent in efficiency of power transmission and durability, and can be manufactured at low cost and relieve a start shock.

According to the second aspect of the present invention, the axle base between the output shaft and the input shaft can be smaller. The output shaft of the engine and the input shaft of the transmission can be arranged to be compact. The engine and the transmission can be compact.

According to the third aspect of the present invention, the center of gravity of heavy parts such as the first shift clutch and the second shift clutch can be close to the housing. The input shaft requiring strength for disposition of the first shift clutch and the second shift clutch is shortened for weight reduction.

According to the fourth aspect of the present invention, the difference in length between the oil paths 67 and 68 to the first shift clutch and the second shift clutch constructed of hydraulic clutches can be smaller, which contributes to making the operating response of the first shift clutch and the second shift clutch uniform to improve the shift feeling.

According to the fifth aspect of the present invention, the power from the centrifugal clutch is equally transmitted to the first shift clutch and the second shift clutch, which contributes to making the operating response of the first shift clutch and the second shift clutch uniform to improve the shift feeling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
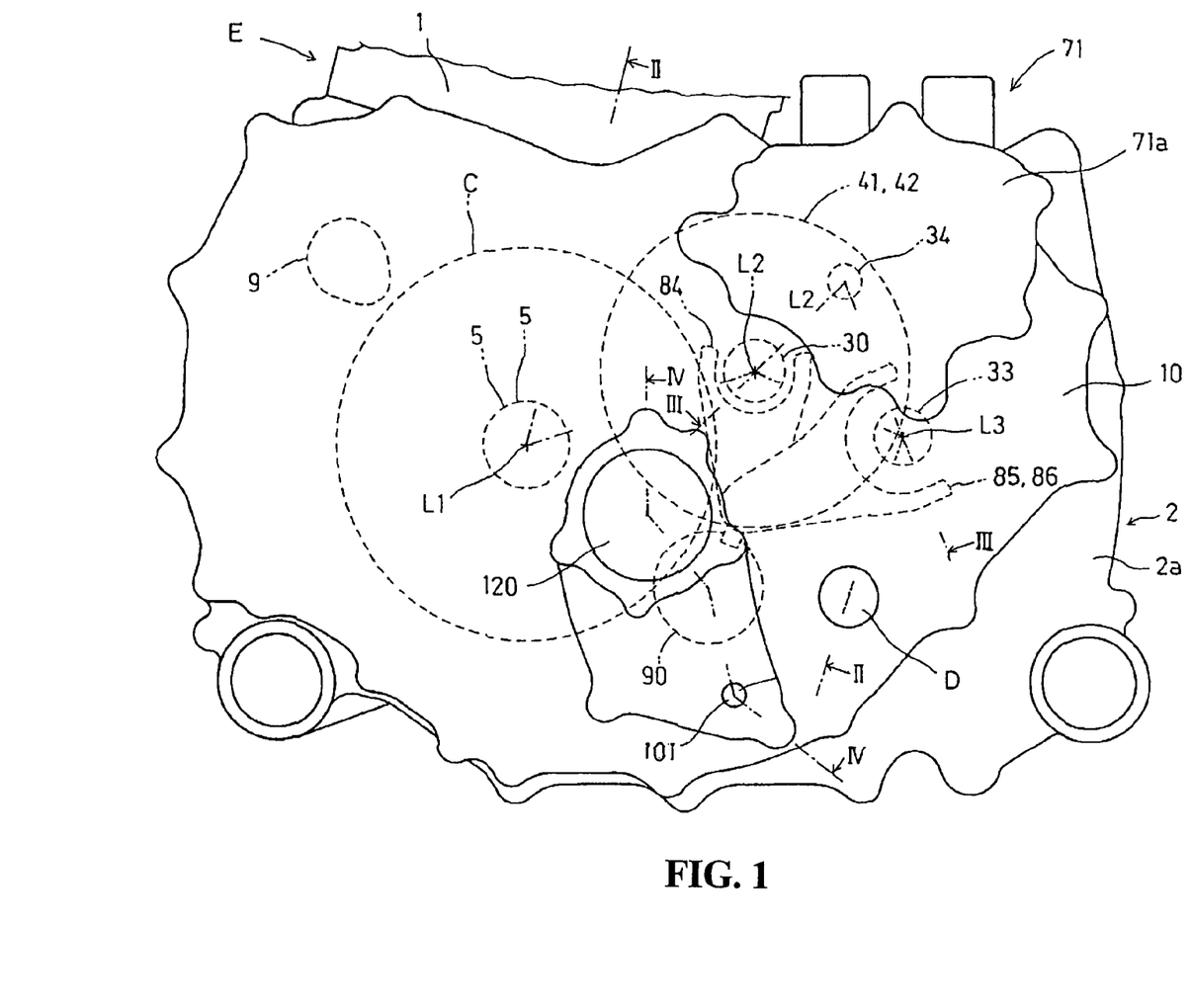
FIG. 1 shows an embodiment of the present invention and is a schematic front view of an essential part of a power unit having an internal combustion engine and a transmission.
Figure 2:
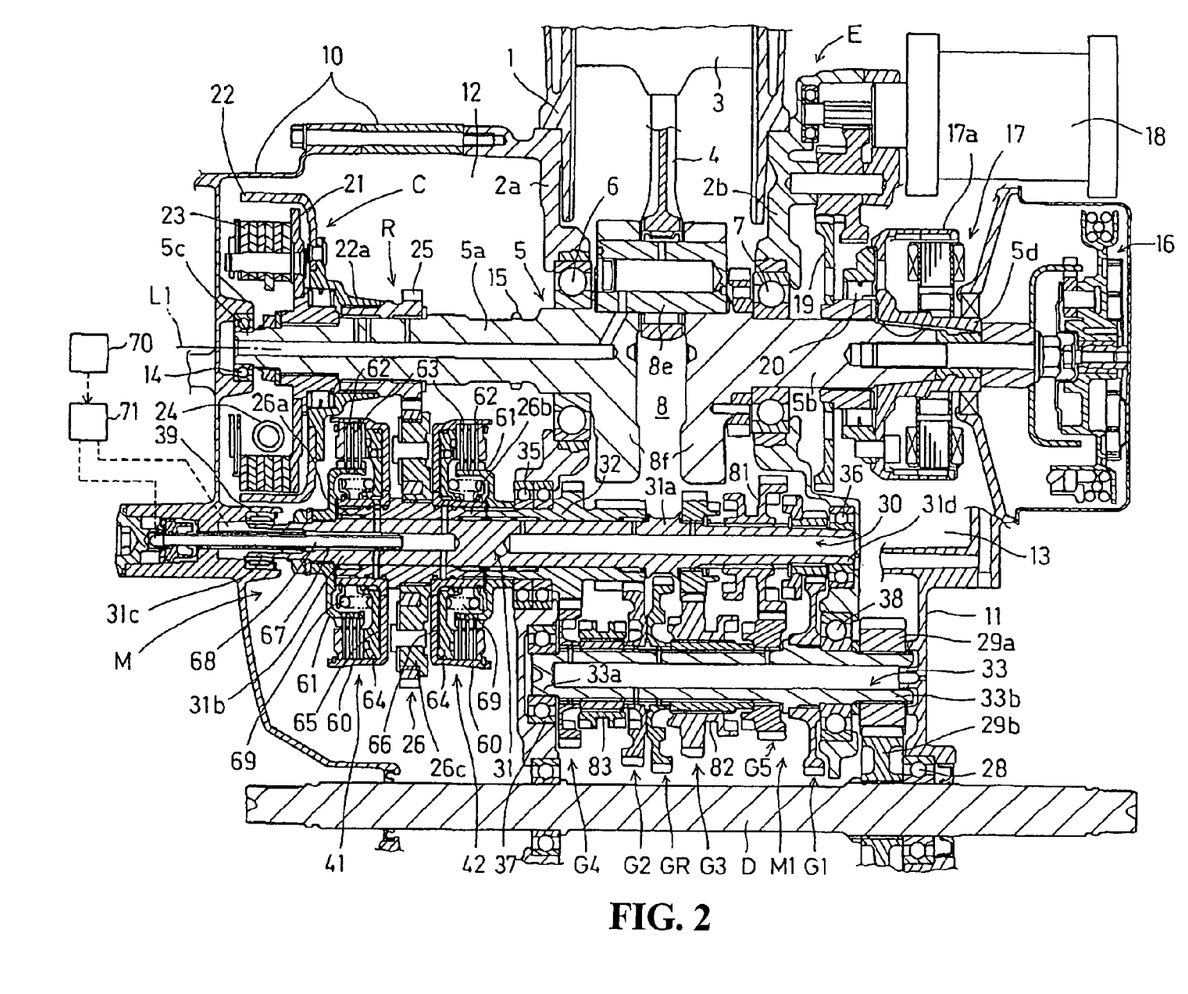
FIG. 2 is a schematic cross-sectional view taken along line II-II of FIG. 1.

Referring to FIGS. 1 and 2, a vehicular power transmission system to which the present invention is applied constructs a power unit mounted on a saddle-ride type ATV (All Terrain Vehicle) as a vehicle together with an internal combustion engine E as an engine. The power transmission system has a constant-mesh type gear transmission M (hereinafter, called a "transmission M") as an automatic transmission selecting gear trains G1 to G5 and GR from shift gear trains M1 to establish a running gear step, a centrifugal clutch C constructing a start clutch transmitting and interrupting a power produced by the internal combustion engine E to the transmission M, and a drive axle D to which the power shifted by the transmission M is transmitted. The power of the drive axle D is transmitted to a front wheel and a rear wheel via a front drive shaft and a rear drive shaft, and then, the wheels are rotatably driven.

The internal combustion engine 3 is a water-cooled type single-cylinder four-stroke internal combustion engine and has an engine body having a cylinder 1 in which a piston 3 is fitted and reciprocated, a cylinder head and a head cover sequentially stacked on the cylinder 1 to be coupled, and a crankcase 2 coupled to the lower end of the cylinder 1. The crankcase 2 as a housing rotatably supporting a crankshaft 5 having a rotation center line L1 orienting the front and rear directions of a vehicle body via a pair of main bearings 6 and 7 is constructed by coupling two case half bodies 2a and 2b divided into two in an axial direction as the direction of the rotation center line L1, here, the front case half body 2a and the rear case half body 2b to form a crank chamber 8 housing a crank part of the crankshaft 5. The crank part is a part including a crankpin 8e and a crank web 8f.

The internal combustion engine E has an intake valve and an exhaust valve which open and close an intake port and an exhaust port disposed on the cylinder head, and an over-head valve system opening and closing the intake valve and the exhaust valve by a push rod driven by a valve cam of a camshaft 9 in synchronization with rotation of the crankshaft 5. The piston 3 driven by a combustion pressure produced by combusting an air-fuel mixture drawn in from the intake port in a combustion chamber formed between the piston 3 and the cylinder head rotatably drives the crankshaft 5 via a connecting rod 4.

The crankshaft 5 as an output shaft of the internal combustion engine E has a front extension part 5a and a rear extension part 5b extended forward and rearward from the crank chamber 8. The term "front" means one side of an axial direction of the crankshaft 5a and the term "rear" means the other side of the axial direction thereof, and vice versa. The terms "front" or "rear" can mean one side or the other side of the axial direction.

The front case half body 2a is coupled to a front cover 10 covering the front case half body 2a from the front side. The front case half body 2a and the front cover 10 form a front housing 12. The front extension part 5a extended forward from the main bearing 6 held by the front case half body 2a is extended in the front housing 12. A front shaft end 5c is rotatably supported by the front cover 10 via a bearing 14. The rear case half body 2b is coupled to a rear cover 11 covering the rear case half body 2b from the rear side. The rear case half body 2b and the rear cover 11 form a rear housing 13. The rear extension part 5 extended rearward from the main bearing 7 held by the rear case half body 2b is extended in the rear housing 13.

In the front housing 12, the front extension part 5a is provided sequentially with the front shaft end 5c, the centrifugal clutch C, a primary speed reduction mechanism R, and a driving sprocket 15 constructing a transmission mechanism for valves rotatably driving the camshaft 9. In the rear housing 13, the rear extension part 5b is provided sequentially with a rear shaft end 5d coupled to a recoil starter 16, an alternator 17, and a starting driven gear 19 constructing a starting speed reduction mechanism transmitting rotation of a starter motor 18 attached to the rear cover 11 to the crankshaft 5. The driven gear 19 is coupled to a rotor 17a of the alternator 17 via a one-way clutch 20.

The centrifugal clutch C has a plate-like clutch inner 21 as an input member integrally rotated with the crankshaft 5, a bowl-like clutch outer 22 as an output member surrounding the clutch inner 21 outward in the diameter direction, and a clutch shoe 23 pivoted by the clutch inner 21 and serving as a centrifugal weight controlling the intermittent state of the centrifugal clutch C by a centrifugal force produced in accordance with the rotational speed of the crankshaft 5 as an engine rotational speed. When the engine rotational speed exceeds an idling speed, the clutch shoe 23 against a resilience force of a clutch spring 24 is swung outward in the diameter direction of the crankshaft 5 by the centrifugal force to start being contacted with the clutch outer 22. The power of the internal combustion engine E is transmitted from the clutch inner 21 to the clutch outer 22. As the engine rotational speed is increased, the centrifugal clutch C is changed through the partial clutch engagement state (partial connected state) in which the clutch outer 22 is rotated while causing slight sliding between it and the clutch shoe 23, and then, into the perfect connected state in which the clutch inner 21 is rotated integrally with the clutch outer 22.

The primary speed reduction mechanism R has a driving gear 25 as a driving rotor relatively rotatably supported by the front extension part 5a and spline fitted in a boss part of the clutch outer 22 to be integrally rotatably coupled to the clutch outer 22, and a driven gear 26 as a driven rotor engaged with the driving gear 25 and provided with a damper suppressing rotation fluctuation of the crankshaft 5. The driven gear 26 relatively rotatably disposed on a first main shaft 31 and a second main shaft 32 of the transmission M has a pair of front and rear coupling parts 26a and 26b having boss parts extended in the front and rear directions by interposing therebetween a disc part 26c in the outer periphery of the first main shaft 31, and transmits the power to a first shift clutch 41 and a second shift clutch 42 of the transmission M via a front coupling part 26a and a rear coupling part 26b. The primary speed reduction mechanism R is a transmission mechanism transmitting the power from the centrifugal clutch C to the first shift clutch 41 and the second shift clutch 42.

Figure 3:
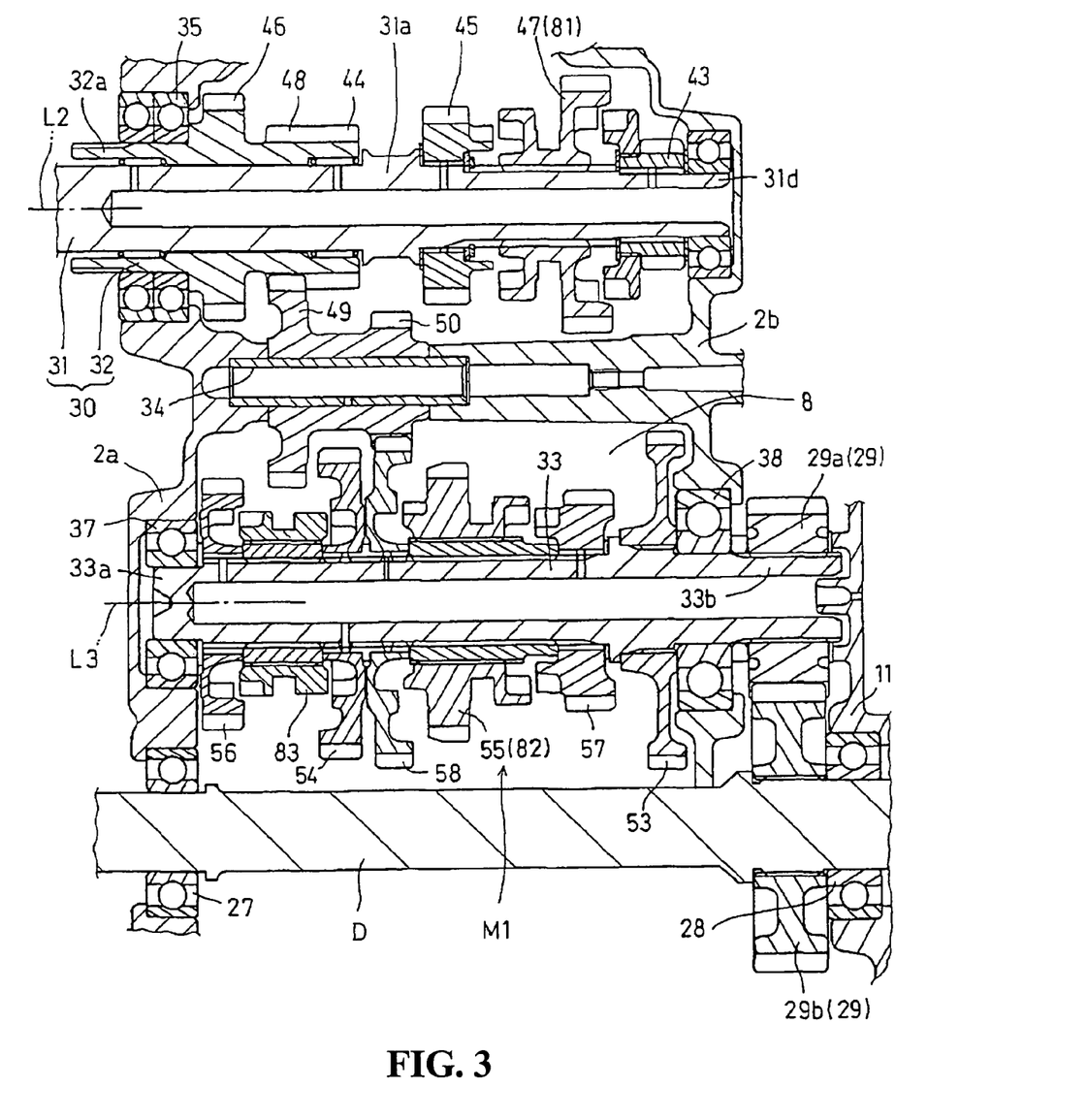
FIG. 3 is a schematic cross-sectional view taken along line III-III of FIG. 1.

Referring to FIG. 3, the transmission M has a main shaft 30 as an input shaft and a counter shaft 33 as an output shaft rotatably supported via bearings 35, 36, and 37, 38 by the front case half body 2a and the rear case half body 2b and having rotation center lines L2 and L3 in parallel with the rotation center line L1, an intermediate shaft 34 fixed at both ends to the front case half body 2a and the rear case half body 2b and having a center axis line in parallel with the rotation center line L1, the shift gear trains M1 as a collection of the gear trains G1 to G5 and GR setting gear steps, a selection mechanism M2 selecting specified gear steps for realizing shifting at a running gear ratio set by an electronic controlled unit 70 based on a signal from the later-described driving state detection means 74, and the first shift clutch 41 and the second shift clutch 42 transmitting and interrupting the power of the internal combustion engine E to the shift gear trains M1. In the transmission M, the main shaft 30, the counter shaft 33, the intermediate shaft 34, and the drive axle D are arranged in parallel with the crankshaft 5 and are supported by the crankcase 2 serving as a transmission case.

The main shaft 30 has the first main shaft 31 and the second main shaft 32 arranged across the crank chamber 8 and the front housing 12. The first main shaft 31 is relatively rotatably and coaxially extended through the second main shaft 32 constructed of a hollow shaft. The first main shaft 31 having a shaft length longer than that of the second main shaft 32 to define the shaft length of the main shaft 30 has an inner shaft part 31a housed in the crank chamber 8 and an outer shaft part 31b housed in the front housing 12. The outer shaft part 31b as an extension part extended forward from the bearing 35 in the front housing 12 is rotatably supported by the front cover 10 via a bearing 39 at a front shaft end 31c. The outer shaft part 31b is provided sequentially with the first shift clutch 41, the driven gear 26, and the second shift clutch 42 from a front shaft end 31c toward the crankcase 2. The driven gear 26 is arranged between both the shift clutches 41 and 42 in the axial direction of the main shaft 30. A rear shaft end 31d of the first main shaft 31 is supported by the rear case half body 2b.

In the counter shaft 33 in which a front shaft end 33a is supported by the bearing 37, a rear shaft end 33b protruded rearward from the bearing 38 to be extended in the rear housing 13 is provided with an outputting driving gear 29a driving the drive axle D rotatably supported by the front case half body 2a and the rear case half body 2b via bearings 27 and 28. The outputting driving gear 29a constructs a secondary speed reduction mechanism 29 as a transmission mechanism reducing the speed of the power from the transmission M and transmitting it to the drive axle D together with an outputting driven gear 29b disposed on the drive axle D. The secondary speed reduction mechanism 29 is housed in the rear housing 13.

Referring to FIGS. 2 and 3, the shift gear trains M1 as shift elements housed in the crank chamber 8 serving as a transmission chamber have the shift gear trains G1 to G5 and GR as plural shift elements setting plural gear steps. Specifically, the first speed gear train G1 setting a first speed gear step has a driving gear 43 relatively rotatably disposed on the inner shaft part 31a, and a driven gear 53 engaged with the driving gear 43 and integrally rotatably disposed on the counter shaft 33. The second speed gear train G2 setting a second speed gear step has a driving gear 44 integrally molded with the second main shaft 32 and integrally rotatably disposed thereon, and a driven gear 54 engaged with the driving gear 44 and relatively rotatably disposed on the counter shaft 33. The third speed gear train G3 setting a third speed gear step has a driving gear 45 relatively rotatably disposed on the inner shaft part 31a, and a driven gear 55 engaged with the driving gear 45 and integrally rotatably disposed on the counter shaft 33.

The fourth speed gear train G4 setting a fourth speed gear step has a driving gear 46 integrally molded with the second main shaft 32 and integrally rotatably disposed thereon, and a driven gear 56 engaged with the driving gear 46 and relatively rotatably disposed on the counter shaft 33. The fifth speed gear train G5 setting a fifth speed gear step has a driving gear 47 integrally rotatably disposed on the inner shaft part 31a, and a driven gear 57 engaged with the driving gear 47 and relatively rotatably disposed on the counter shaft 33. The rearward gear train GR setting a rearward gear step has a driving gear 48 integrally molded with the driving gear 44, a driven gear 58 relatively rotatably disposed on the counter shaft 33, a first intermediate gear 49 engaged with the driving gear 48 and relatively rotatably disposed on the intermediate shaft 34, and a second intermediate gear 50 engaged with the driven gear 58 and integrally molded with the first intermediate gear 49 to be integrally rotated.

The gear trains G1, G3, and G5 having the driving gears 43, 45, and 47 disposed on the first main shaft 31 construct a first shifting part shifting the power of the internal combustion engine E. The first shift clutch 41 transmits and interrupts the power to the first shifting part. The gear trains G2, G4, and GR having the driving gears 44, 46, and 48 disposed on the second main shaft 32 construct a second shifting part shifting the power of the internal combustion engine E. The second shift clutch 42 transmits and interrupts the power to the second shifting part.

The first shift clutch 41 is positioned to be closer to the front case half body 2a than the centrifugal clutch C adjacent the centrifugal clutch C in the axial direction. The first shift clutch 41 is spline fitted in the front coupling part 26a on the input side of the power of the internal combustion engine E transmitted via the centrifugal clutch C and the primary speed reduction mechanism R to be integrally rotatably coupled thereto, and is spline fitted in the outer shaft part 31b on the output side of the power to the first main shaft 31 to be integrally rotatably coupled thereto.

The second shift clutch 42 arranged on the opposite side of the first shift clutch 41 across the driven gear 26 in the axial direction is spline fitted in the rear coupling part 26b on the input side of the power of the internal combustion engine E transmitted via the centrifugal clutch C and the primary speed reduction mechanism R to be integrally rotatably coupled thereto, and is spline fitted in a front shaft end 32a protruded forward from the bearing 35 to be extended in the front housing 12 on the output side of the power to the second main shaft 32 and to be integrally rotatably coupled thereto.

Both the first shift clutch 41 and the second shift clutch 42 are hydraulic clutches of a multiple disc friction type of the same construction and each have a bowl-like clutch outer 60 as an input member spline fitted in the outer periphery of the front coupling part 26a or the rear coupling part 26b to be integrally rotatably disposed thereon, plural clutch plates 62 integrally rotatably engaged with the clutch outer 60, plural second clutch plates 63 stacked alternately with the first clutch plates 62, a clutch inner 61 as an output member integrally rotatably engaged with the second clutch plates 63, and a piston 64 slidably fitted in the clutch outer 60 such that the first clutch plates 62 and the second clutch plates 63 are press-contacted with each other.

The first shift clutch 41 and the second shift clutch 42 are formed with hydraulic chambers 65 and 66 by the clutch outers 60 and the pistons 64. The hydraulic chamber 65 of the first shift clutch 41 is arranged to be closer to the second shift clutch 42 in the axial direction. The hydraulic chamber 66 of the second shift clutch 42 is arranged to be closer to the first shift clutch 41 in the axial direction. The first shift clutch 41 and the second shift clutch 42 are arranged back to back so that the hydraulic chamber 65 and the hydraulic chamber 66 are close to each other in the axial direction. The oil pressure of the hydraulic chambers 65 and 66 is controlled by supplying and discharging working fluid to/from the hydraulic chambers 65 and 66 through oil paths 67 and 68 disposed in the front cover 10 and the front extension part 5a.

When the oil pressure of the hydraulic chambers 65 and 66 is high, the piston presses the first clutch plates 62 and the second clutch plates 63 against a resilient force of a return spring 69 so that the power transmission system is changed into the connected state in which the clutch outers 60 and the clutch inners 61 are integrally rotated by friction between both the first clutch plates 62 and the second clutch plates 63. When the oil pressure of the hydraulic chambers 65 and 66 is low, both the first clutch plates 62 and the second clutch plates 63 are separated from each other by a resilient force of the return spring 69 so that the power transmission system is changed into the disconnected state in which transmission of the power is interrupted between the clutch outers 60 and the clutch inners 61.

The pressure of the working fluid of the hydraulic chambers 65 and 66 is controlled by a hydraulic controller. The hydraulic controller has a control valve unit 71 controlling the discharge pressure of the hydraulic pump to control the oil pressure of the hydraulic chambers 65 and 66 using a hydraulic pump driven by the crankshaft 5 as a hydraulic source. The control valve unit 71 has a valve housing 71a (see FIG. 1) attached to the front cover 10, and plural hydraulic control valves housed in the valve housing 71a. The hydraulic control valves are controlled by the electronic controlled unit 70. Supply and discharge of the working fluids to/from the hydraulic chambers 65 and 66 through the oil paths 67 and 68 disposed on the first main shaft 31 are controlled. Disconnection or connection of the first shift clutch 41 and the second shift clutch 42, that is, the intermittent state is controlled.

In the first shift clutch 41, the power from the primary speed reduction mechanism R is transmitted to the clutch outer 60. The clutch inner 61 transmits the power to the first main shaft 31. In the second shift clutch 42, the power from the primary speed reduction mechanism R is transmitted to the clutch outer 60. The clutch inner 61 transmits the power to the second main shaft 32.

The first shift clutch 41 and the second shift clutch 42 are arranged between the front case half body 2a and the centrifugal clutch C in the axial direction. A coupling part 22a of the clutch outer 22 of the centrifugal clutch C to the driving gear 25 is overlapped with almost the entire second shift clutch 42. The clutch inner 61 of the second shift clutch 42 is arranged near the front case half body 2a in the axial direction to be contacted with the bearing 35 in the axial direction. The clutch outers 60 as members close to the driven gear 26 in the first shift clutch 41 and the second shift clutch 42 are positioned near the disc part 26c of the driven gear 26 in the axial direction.

Referring to FIG. 1, the first shift clutch 41 and the second shift clutch 42 are arranged in positions overlapped with the centrifugal clutch C, seen in the axially direction. The clutch outer 60 as a member having the largest outer diameter in the second shift clutch 42 in the diameter direction of the front extension part 5a is positioned near the coupling part 22a. The clutch outer 22 as a member having the largest outer diameter in the centrifugal clutch C is positioned near the outer shaft part 31b. The clutch outer 22 of the centrifugal clutch C is in a position overlapped with the inner periphery part of the clutch outer 60 or the inner periphery part of the piston 64 in the diameter direction, seen in the axially direction.

Figures 4A, 4B:
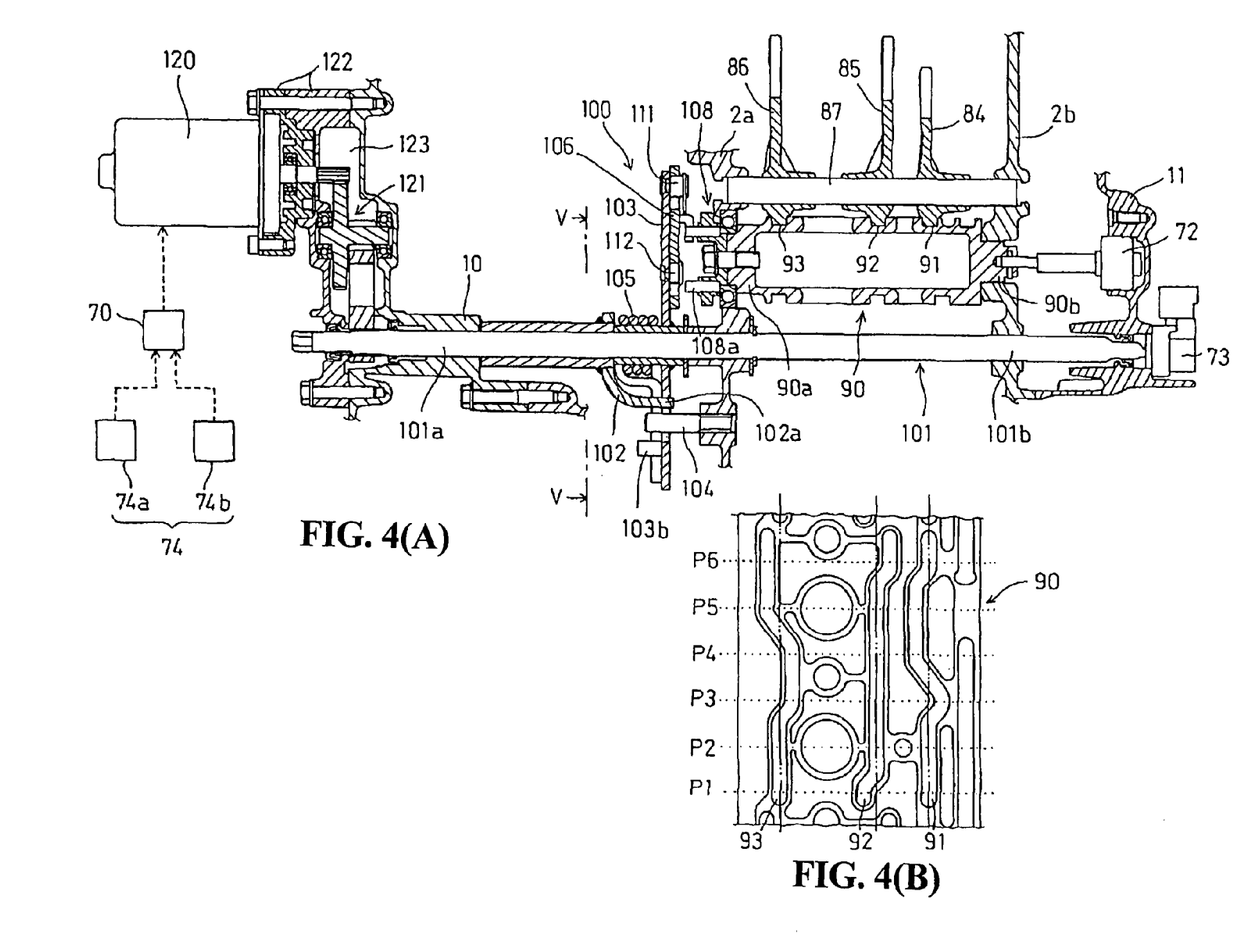
FIG. 4(A) is a schematic cross-sectional view taken along line IV-IV of FIG. 1.
FIG. 4(B) is a developed view showing cam grooves of a shift drum of the transmission.

Referring to FIGS. 2 to 4, the selection mechanism M2 has plural, here, three shifters 81 to 83 movable in the axial direction on the main shaft 30 or the counter shaft 33 in order to change the gear trains G1 to G5 and GR into the connected state integrally rotatable with the main shaft 30 or the counter shaft 33 or into the disconnected state relatively rotatable therewith for the purpose of selecting gear steps, a predetermined plural number (equal to that of the shifters 81 to 83) of, here, three shift forks 84 to 86 slidably supported in the axial direction by a support shaft 87 supported by the front case half body 2a and the rear case half body 2b in order to move the shifters 81 to 83, one shift drum 90 in which cam grooves 91 to 93 as guide parts guiding and moving the shifters 81 to 83 by guiding and moving the shift forks 84 to 86 in the axial direction are disposed on its outer periphery surface, an intermittent feeding mechanism 100 intermittently rotating the shift drum 90, and a reversely rotatable electric motor 120 as one actuator as driving means operating the intermittent feeding mechanism 100 based on an instruction from the electronic controlled unit 70.

The three shifters 81 to 83 having protrusions engageable with the gears constructing the gear trains G1 to G5 and GR are the first shifter 81 for shifting of the first speed and the third speed, the second shifter 82 for shifting of the fifth speed and the rearward speed, and the third shifter 83 for shifting the second speed and the fourth speed. The shift forks 84 to 86 have the first shift fork 84 engaged with the first shifter 81, the second shift fork 85 engaged with the second shifter 82, and the third shift fork 86 engaged with the third shifter 83. The shifters 81 to 83 corresponding to the shift forks 84 to 86 guided and moved by the cam grooves 91 to 93 in accordance with rotation of the shift drum 90 are moved to selection positions realizing the connected state and the neutral position realizing the disconnected state.

The first shifter 81 is constructed of the driving gear 47 serving as a shifter and is spline fitted in the inner shaft part 31a between the driving gear 43 and the driving gear 45 to be movable in the axial direction. The driving gear 47 (the first shifter 81) is moved rearward to a selection position to be engaged with the driving gear 43 for selecting the first speed gear train G1 (the first speed gear step). The driving gear 47 (the first shifter 81) is moved forward to another selection position to be engaged with the driving gear 45 for selecting the third speed gear train G3 (the third speed gear step).

The second shifter 82 is constructed of the driven gear 55 serving as a shifter and is spline fitted in the counter shaft 33 between the driven gear 57 and the driven gear 58 to be movable in the axial direction. The driven gear 55 (the second shifter 82) is moved rearward to a selection position to be engaged with the driven gear 57 for selecting the fifth speed gear train G5 (the fifth speed gear step). The driven gear 55 (the second shifter 82) is moved forward to another selection position to be engaged with the driven gear 58 for establishing the rearward gear train GR as a gear train when the vehicle is moved rearward.

The third shifter 83 is spline fitted in the counter shaft 33 between the driven gear 54 and the driven gear 56 to be movable in the axial direction. The third shifter 83 is engaged with the driven gear 54 for establishing the second speed gear train G2. They are moved forward to another selection position to be engaged with the driven gear 56 for selecting the fourth speed gear train G4 (the fourth speed gear step).

When the shifters 81 to 83 occupy the neutral position, none of the gear trains G1 to G5 and GR (gear steps) is selected.

The shift drum 90 having a rotation center line in parallel with the rotation center lines L1 to L3 is rotatably supported by the front case half body 2a via a bearing 94 at a front end 90a and is rotatably supported by the rear case half body 2b at a rear end 90b. The shift forks 84 to 86 are guided by the cam grooves 91 to 93 to be moved in the axial direction in accordance with rotation of the shift drum 90 rotated by the intermittent feeding mechanism 100 coupled to the front end 90a. The gear trains G1 to G5 and GR can be then selected. As shown in FIG. 4(B), the shift drum 90 normally rotated and reversely rotated by being rotatably driven by the electric motor 120 occupies plural, here, six predetermined rotation positions P1 to P6 setting the shifting position of the transmission M. The predetermined rotation positions P1 to P6 are set by the later-described intermittent feeding mechanism 100 as a positioning mechanism of the shift drum 90. The predetermined rotation positions P1 to P6 are detected by a rotation position detector 72 constructed of a potentiometer. The rotation position detector 72 is attached to the rear cover 11 to be connected to the rear end of the shift drum 90.

Figure 5A:
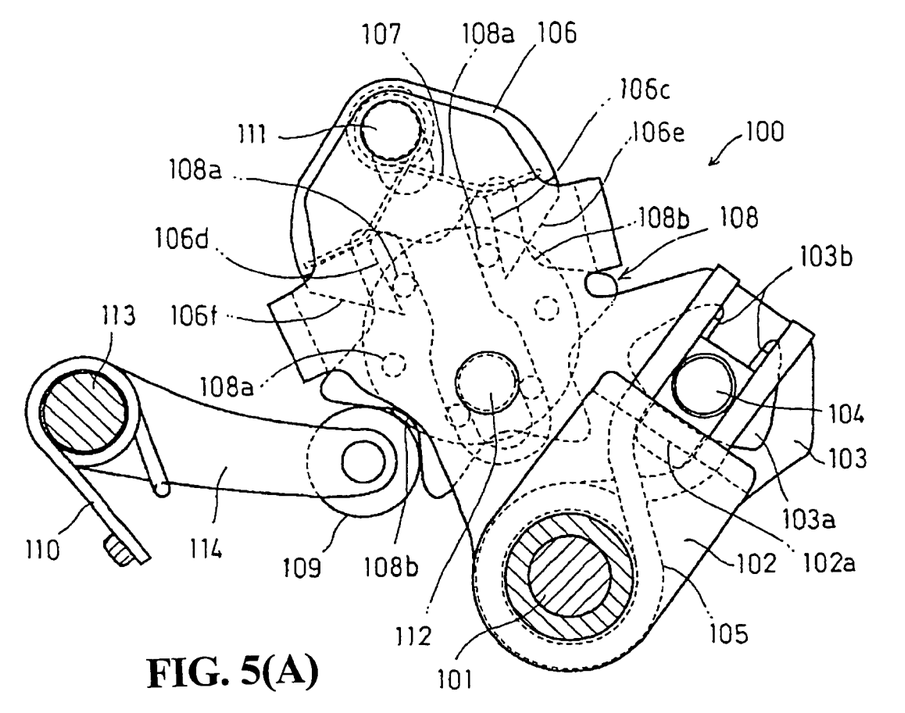
FIG. 5(A) is a cross-sectional view taken along line V-V of FIG. 4(A)
Figure 5B:
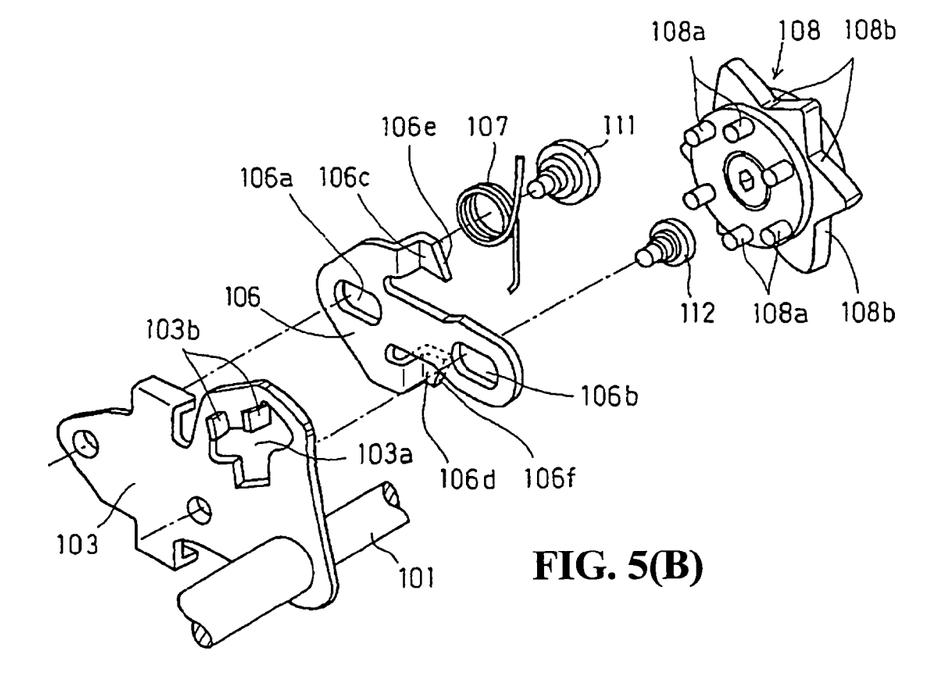
FIG. 5(B) is an exploded perspective view of an essential part of a selection mechanism of the transmission.

Referring to FIGS. 4 and 5, the intermittent feeding mechanism 100 has a shift spindle 101 rotatably driven by the electric motor 120, an arm 102 fixed to the shift spindle 101, a change arm 103 relatively rotatably supporting the shift spindle 101, a regulation pin 104 fixed to the front case half body 2a to be inserted into the change arm 103, a return spring 105 returning the change arm 103 to the neutral position, a shifter plate 106 supported by the change arm 103 so as to be relatively moved between it and the change arm 103 in the diameter direction of the shift spindle 101, a spring 107 exerting the shifter plate 106 inward in the diameter direction, a pin plate 108 fixed to the front end 90a of the shift drum 90 opposite the shifter plate 106 in the direction of the rotation center line of the shift drum 90 and provided with plural feeding pins 108a, and a roller 109 exerted by a spring 110 in the direction brought into contact with the outer periphery of the pin plate 108.

The shift spindle 101 rotatably extended through both the case half bodies 2a and 2b in the front and rear directions is rotatably supported by the front cover 10 at a front end 101a protruded forward from the front case half body 2a and is rotatably supported by the rear case half body 2b at a rear end 101b.

The change arm 103 is provided with a spring receiving part 103b formed by folding part of the change arm 103 at a front end 102a of the arm 102 and an edge defining an opening 103a into which the regulation pin 104 is inserted. When the change arm 103 is in the neutral position, both ends of the return spring 105 play fitted in the shift spindle 101 are brought into contact with both sides of the spring receiving part 103b.

In the state that the change arm 103 is in the neutral position, the shift spindle 101 rotated in any one of the normal and reverse directions rotates the change arm 103 in any one of the normal and reverse directions against the return spring 105 until the front end 102a of the arm 102 bends the return spring 105 to be brought into contact with one side edge of the opening 103a. The change arm 103 is rotated until the edge of the opening 103a is brought into contact with the regulation pin 104.

Guide pins 111 and 112 inserted into and engaged with elongate holes 106a and 106b provided in the shifter plate 106 are fixed to the change arm 103 by caulking. The shifter plate 106 can be slid to the change arm 103 along the diameter direction of the shift spindle 101.

The shifter plate 106 is provided with feed pawls 106c and 106d folded to the shift drum 90 side. The feed pawls 106c and 106d are formed outside with cams 106e and 106f. Six feed pins 108a are disposed so that two feed pins 108a are arranged between both the feed pawls 106c and 106d. The pin plate 108 is formed in the outer periphery with six concave portions 108b at an equal pitch in the periphery direction. The roller 109 is axially supported by an arm 114 in which one end is slidably supported by the front case half body 2a via a support shaft 113.

In the selection mechanism M2, rotation of the change arm 103 in any one of the normal and reverse directions in accordance with rotation of the shift spindle 101 in any one of the normal and reverse directions engages one of both the feed pawls 106c and 106d of the shifter plate 106 with one of the feed pins 108a of the pin plate 108 and the shift drum 90 is intermittently rotated in any one of the normal and reverse directions. When the change arm 103 is returned to the neutral position by a spring force of the return spring 105, one of the feed pins 108a of the pin plate 108 is brought into contact with one of the cams 106e and 106f of both the feed pawls 106c and 106d of the shifter plate 106. The shifter plate 106 is moved outward in the diameter direction of the shift spindle 101 against a spring force of the spring 107. One of both the feed pawls 106c and 106d passes over one of the feed pins 108a. The rotation position of the pin plate 108 is held by engaging the roller 109 with one of the concave portions 108b of the pin plate 108. The shift drum 90 occupies the predetermined rotation positions P1 to P6 and is stopped corresponding to the concave portion 108b with which the shift drum 90 is engaged.

The front end 101a of the shift spindle 101 is coupled to the electric motor 120 via a speed reduction gear train 121. The electric motor 120 is attached to a gear case 122. The speed reduction gear train 121 is housed in a gear case 123 formed between the front cover 10 and the gear case 121. A rotation position detector 124 constructed of a potentiometer detecting the rotation position of the shift spindle 101 is attached to the rear cover 11.

A signal from driving state detection means 74 and both rotation position detectors 72 and 73 detecting the driving state of the internal combustion engine E and the vehicle is inputted to the electronic controlled unit 70 controlling the intermittent state of the first shift clutch 41 and the second shift clutch 42 and the rotation amount and the rotation direction of the electric motor 120. The driving state detection means 74 has vehicle velocity detection means 74a and accelerator opening detection means 74b detecting a load of the internal combustion engine E. The electronic controlled unit 70 rotatably drives the shift spindle 101 based on the signal from the driving state detection means 74 to automatically control the shifting position of the transmission M in accordance with the driving state. The electronic controlled unit 70 feedback controls the rotation position of the shift spindle 101 based on the rotation position detected by the rotation position detector 73 and can control with high accuracy the rotational speed of the shift spindle 101 changed in accordance with the rotation position.

As an option device for controlling the shifting position of the transmission M, a shift switch having a shift up switch and a shift down switch disposed on the handlebar of the vehicle may be provided as a shifting operation part to which a shifting position instructed by the rider is inputted. In this case, the electronic controlled unit 70 to which a signal from the shift switch is inputted controls operation of the electric motor 120 in accordance with the signal from the shift switch and controls rotation of the shift drum 90 via the shift spindle 101 and the intermittent feeding mechanism 100.

Referring to FIGS. 3 and 4, establishment of the running gear steps in the cam grooves 91 to 93 and the transmission M will be focusably described.

The cam grooves 91 to 93 equal in number to that of the shifters 81 to 83 and the shift forks 84 to 86 are the first cam groove 91 guiding the first shift fork 84, the second cam groove 92 guiding the second shift fork 85, and the third cam groove 93 guiding the third shift fork 86. The cam grooves 91 to 93 guide the corresponding shifters 81 to 83 via the shift forks 84 to 86 to move them in the axial direction and can select, corresponding to the predetermined rotation positions P1 to P6, the shifting positions of the transmission M, that is, plural shifting positions when the vehicle is moved forward, here, the first speed position to the fifth speed position, the rearward position when the vehicle is moved rearward, and the neutral position.

When in accordance with the signal from the driving state detection means 74, the shift drum 90 is rotated in the normal direction or the reverse direction by being automatically driven by the electric motor 120 via the intermittent feeding mechanism 100, in the range of the predetermined rotation positions P1 to P6, the first cam groove 91 guides the first shift fork 84 in the first shifting part so that the driving gear 47 (the first shifter 81) selects the first speed gear step and the third speed gear step, the second cam groove 92 guides the second shift fork 85 in the first shifting part so that the driven gear 55 (the second shifter 82) selects the fifth speed gear step and the rearward gear step, and the third cam groove 93 guides the third shift fork 86 in the second shifting part so that the third shifter 83 selects the second speed gear step and the fourth speed gear step.

More specifically, this will be as follows.

When the shift drum 90 is in the predetermined rotation position P2 in the neutral position of the transmission M, the first shifter 81 to the third shifter 83 are in the neutral position.

From this state, in the rotation direction of the shift drum 90 at shift up, the cam grooves 91 to 93 guide the shift forks 84 to 86, that is, the shifters 81 to 83 so that the shifters 81 to 83 sequentially occupy the positions explained next.

When the shift drum 90 occupies the predetermined rotation position P3, in the first shifting part, the first cam groove 91 guides the first shifter 81 to the selection position selecting the first speed gear step and the second cam groove 92 guides the second shifter 82 to the neutral position, and, in the second shifting part, the third cam groove 93 guides the third shifter 83 to the selection position selecting the second speed gear step.

When the shift drum 90 occupies the predetermined rotation position P4, in the first shifting part, the first cam groove 91 guides the first shifter 81 to the selection position selecting the third speed gear step and the second cam groove 92 guides the second shifter 82 to the neutral position, and, in the second shifting part, as in the predetermined rotation position P3, the third cam groove 93 guides the third shifter 83 to the selection position selecting the second speed gear step.

When the shift drum 90 occupies the predetermined rotation position P5, in the first shifting part, as in the predetermined rotation position P4, the first cam groove 91 guides the first shifter 83 to the selection position selecting the third speed gear step and the second cam groove 92 guides the second shifter 82 to the neutral position, and, in the second shifting part, the third cam groove 93 guides the third shifter 83 to the selection position selecting the fourth speed gear step.

When the shift drum 90 occupies the predetermined rotation position P6, in the first shifting part, the first cam groove 91 guides the first shifter 81 to the neutral position and the second cam groove 92 guides the second shifter 82 to the selection position selecting the fifth speed gear step, and, in the second shifting part, as in the predetermined rotation position P5, the third cam groove 93 guides the third shifter 83 to the selection position selecting the fourth speed gear step.

At shift down, the shift drum 90 is rotated in the reverse direction and occupies the shifting position in the reverse order of the foregoing.

When the shift drum 90 is rotated from the predetermined rotation position P2 in the rotation direction at shift down to occupy the predetermined rotation position P1, in the first shifting part, the first cam groove 91 guides the first shifter 81 to the neutral position and the second cam groove 92 guides the second shifter 82 to the selection position selecting the rearward gear step, and, in the second shifting part, the third cam groove 93 guides the third shifter 83 to the neutral position. This establishes the rearward gear step as the running gear step when the vehicle is moved rearward.

In the forward shifting position, the cam grooves 91 to 93 guide the shifters 81 to 83 to the selection positions in which the different gear steps are selected one by one at the same time in the first shifting part and the second shifting part for each of the predetermined rotation positions P3 to P6 of the shift drum 90. In the predetermined rotation positions P3 to P6, the gear steps selected in the first shifting part and the second shifting part are two consecutive gear steps in plural, here, five gear steps, obtained by the transmission M when the vehicle is moved forward.

In the first shifting part, when the second shifter 82 is in the neutral position in the two predetermined rotation positions P4 and P5, the first shifter 81 occupies the selection position engaged with the driving gear 45 of the third speed gear train G3 and the third speed gear train G3 using the driven gear 55 constructing the second shifter 82 as a construction gear selects the third speed gear step and, when the first shifter 81 is in the neutral position in the predetermined rotation position P6, the second shifter 82 occupies the selection position engaged with the driven gear 57 of the fifth speed gear train G5 and the fifth speed gear train G5 using the driving gear 47 constructing the first shifter 81 as a construction gear selects the fifth speed gear step.

When the shift drum 90 is in the predetermined rotation positions P3 to P6, the first shift clutch 41 and the second shift clutch 42 are controlled by the electronic controlled unit 70 corresponding to the shifting position (that is, the running gear step) set based on the driving state detection means 74 and are automatically operated so as to transmit the power to one of the first main shaft 31 and the second main shaft 32 and to interrupt the power to the other shaft for establishing the running gear step in the transmission M. The power shifted at the running gear step is transmitted via the drive axle D to the wheels.

In the predetermined rotation position P3, the first shift clutch 41 transmits the power from the centrifugal clutch C to the first main shaft 31 and the second shift clutch 42 interrupts the power to the second main shaft 32 so that the first gear step is established as the running gear step. When the second gear step is established as the running gear step by the shift up operation, the second shift clutch 42 may be changed into the connected state and the first shift clutch 41 may be changed into the disconnected state. Shifting from the first speed gear step to the second speed gear step (that is, shifting of the gear steps) and shifting from the second speed gear step to the first speed gear step are enabled rapidly with a small shift shock. In the same manner, in the predetermined rotation positions P4 to P6, rapid shifting is enabled at shift up and shift down between the second speed gear step and the third speed gear step, between the third speed gear step and the fourth speed gear step, and between the fourth speed gear step and the fifth speed gear step.

The cam grooves 91 to 93 guide the shifters 81 to 83 to the selection positions in the first shifting part and the second shifting part so that the second speed gear step and the third speed gear step of the first speed gear step, the second speed gear step, and the third speed gear step as the three consecutive gear steps from the low speed side are selected in the adjacent two predetermined rotation positions of the shift drum 90.

For instance, the second speed gear step and the third speed gear step of the second speed gear step to the fourth speed gear step as the three consecutive gear steps from the low speed side are selected in the adjacent two predetermined rotation positions P3 and P4 and the adjacent two predetermined rotation positions P4 and P5 of the shift drum 90 by the third shifter 83 and the first shifter 81 guided by the third cam groove 93 and the first cam groove 91. In the same manner, the third speed gear step and the fourth speed gear step of the third speed gear step to the fifth speed gear step as the three consecutive gear steps from the low speed side are selected in the adjacent two predetermined rotation positions P4 and P5 and the adjacent two predetermined rotation positions P5 and P6 of the shift drum 90 by the first shifter 81 and the third shifter 83 guided by the first cam groove 91 and the third cam groove 93.

Shifting between the third speed gear step and the second speed gear step and the fourth speed gear step as the gear steps interposing the third speed gear step therebetween when the use frequency at the third gear step is high, and shifting between the fourth speed gear step and the third speed gear step and the fifth speed gear step as the gear steps interposing the fourth speed gear step therebetween when the use frequency at the fourth speed gear step is high are done rapidly with a small shock by shifting the first shift clutch 41 and the second shift clutch 42.

The operation and effect of the embodiment constructed above will be described.

The transmission M of the vehicular power transmission system includes the centrifugal clutch C having the clutch shoe 23 controlling the intermittent state by a centrifugal force in accordance with an engine rotational speed as a start clutch transmitting and interrupting the power of the internal combustion engine E from the crankshaft 5 to the first shift clutch 41 and the second shift clutch 42. The power of the internal combustion engine E is transmitted to the first shift clutch 41 and the second shift clutch 42 and to the first shifting part and the second shifting part via the centrifugal clutch C changed from the disconnected state through the partial clutch engagement state to the connected state since the intermittent state is controlled by the clutch shoe 23 operated by the operation of the centrifugal force. As a result, the centrifugal force C excellent in efficiency of power transmission at relatively low cost is used as the start clutch. The vehicular power transmission system in which the first shift clutch 41 and the second shift clutch 42 to which the power of the internal combustion engine E is transmitted shift the gear steps is excellent in efficiency of power transmission and durability, and can be manufactured at low cost and relieve a start shock.

The centrifugal clutch C is disposed on the crankshaft 5. The first shift clutch 41 and the second shift clutch 42 are disposed on the main shaft 30 of the transmission M arranged in parallel with the crankshaft 5 and are arranged in positions overlapped with the centrifugal clutch C, seen in the axial direction of the main shaft 30. The centrifugal clutch C having a relatively large diameter and the first shift clutch 41 and the second shift clutch 42 are arranged to be overlapped with each other, seen in the axial direction. The axle base between the crankshaft 5 and the main shaft 30 can be smaller. The crankshaft 5 of the internal combustion engine E and the main shaft 30 of the transmission M can be arranged to be compact. The power unit having the internal combustion engine E and the transmission M can be compact.

The first shift clutch 41 and the second shift clutch 42 are arranged between the front case half body 2a of the crankcase 2 rotatably supporting the main shaft 30 and the centrifugal clutch C in the axial direction. The first shift clutch 41 and the second shift clutch 42 having a relatively large weight can be arranged to be closer to the crankcase 2 than the centrifugal clutch C. The center of gravity of heavy parts such as the first shift clutch 41 and the second shift clutch 42 can be close to the crankcase 2 as a supporting member. The first main shaft 31 of the main shaft 30 requiring strength for disposition of the first shift clutch 41 and the second shift clutch 42 is shortened for weight reduction.

The first shift clutch 41 and the second shift clutch 42 constructed of hydraulic clutches provided with the hydraulic chambers 65 and 66 are arranged back to back so that the hydraulic chamber 65 of the first shift clutch 41 and the hydraulic chamber 66 of the second shift clutch 42 are close to each other in the axial direction. The difference in length between the oil paths 67 and 68 guiding working fluid to the hydraulic chambers 65 and 66 can be smaller in the first shift clutch 41 and the second shift clutch 42, contributing to making the operating response of the first shift clutch 41 and the second shift clutch 42 uniform to improve the shift feeling.

The driven gear 26 transmitting the power from the centrifugal clutch C to the first shift clutch 41 and the second shift clutch 42 is arranged between the first shift clutch 41 and the second shift clutch 42 in the axial direction. The transmission path lengths of the power from the centrifugal clutch C to the first shift clutch 41 and the second shift clutch 42 can be equal. The equal power is transmitted to the first shift clutch 41 and the second shift clutch 42, contributing to making the operating response of the first shift clutch 41 and the second shift clutch 42 uniform to improve the shift feeling.

In the transmission M in which the selection mechanism M2 thereof has one shift drum 90 rotated based on the shifting operation, and the shifters 81 to 83 guided and moved by the cam grooves 91 to 93 disposed on the shift drum 90 in accordance with rotation of the shift drum 90, the shifters 81 to 83 being movable to the selection positions and the neutral position in the first shifting part and the second shifting part, the cam grooves 91 to 93 guiding the shifters 81 to 83 to the selection positions in the first shifting part and the second shifting part with respect to one of the predetermined rotation positions P3 to P6 of the shift drum 90, so that the first shift clutch 41 and the second shift clutch 42 transmitting and interrupting the power of the internal combustion engine E to the first shifting part and the second shifting part setting the gear steps shift the gear steps, one shift drum 90 can select the gear steps in the first shifting part and the second shifting part at the same time. Plural shift drums are unnecessary. One driving means driving the shift drum 90 is required. Shifting at the selected two gear steps can be done only by shifting the transmission paths of the power by the first shift clutch 41 and the second shift clutch 42. As a result, the gear steps in the first shifting part and the second shifting part are selected by one shift drum 90. The number of parts can be reduced. The transmission M which can be compact and is inexpensive can be obtained.

The first shifting part includes the fifth speed gear train G5 as the first gear train and the third speed gear train G3 as the second gear train which set the gear steps. The cam grooves 91 and 92 guide the first shifter 81 and the second shifter 82 so that when the driving gear 47 (the first shifter 81) is in the neutral position and the driven gear 55 (the second shifter 82) is in the selection position engaged with the driven gear 57, the fifth speed gear step of the fifth speed gear train G5 is selected and, when the driven gear 55 (the second shifter 82) is in the neutral position and the driving gear 47 (the first shifter 81) is in the selection position engaged with the driving gear 45, the third speed gear step of the third speed gear train G3 is selected. The driving gear 47 and the driven gear 55 as components of the fifth speed gear train and the third speed gear train which set the gear steps in the first shifting part serve as the first shifter 81 and the second shifter 82. A shifter different from the gear train need not be disposed between the gear trains. As a result, the fifth speed gear train G5 and the third speed gear train G3 serve as the first shifter 81 and the second shifter 82. The shift drum 90 can be compact in the axial direction. The width of the crankcase 2 housing the shift drum 90 can be smaller in the axial direction. The transmission M becomes compact in the axial direction.

The first main shaft 31 defining the shaft length of the main shaft 30 and provided with the first shifting part is longer than the second main shaft 32 provided with the second shifting part. In the main shaft 30, in the first shifting part disposed on the first main shaft 31, the fifth speed gear train and the third speed gear train serve as the first shifter 81, the second shifter 82. The first main shaft 31 longer than the second main shaft 32 can be shorter. The transmission M becomes compact in the axial direction.

The selection mechanism M2 has one electric motor 120, the shift spindle 101 rotatably driven by the electric motor 120, and the intermittent feeding mechanism 100 intermittently rotating the shift drum 90 in accordance with rotation of the shift spindle 101 and can directly use the shift spindle 101 and the intermittent feeding mechanism 100 which have been used for the manual selection mechanism. As a result, automation of the selection mechanism M2 by employing the electric motor 120 can be done at low cost. When the transmission M is used as a motorcycle including the saddle-ride type ATV (All Terrain Vehicle), the shift drum 90 and the shift spindle 101 can be arranged in the same position as that of the shifting mechanism (gear change mechanism) by feet in the related art. The transmission M can be mounted as the power unit of the vehicle with an automatic transmission without greatly changing the construction of the vehicle with a manual transmission.

By the shifters 81 and 83 guided by the cam grooves 91 and 93, the second speed gear step and the third speed gear step of the second speed gear step to the fourth speed gear step as the three consecutive gear steps from the low speed side are selected in the adjacent two predetermined rotation positions P3 and P4 and the adjacent two predetermined rotation positions P4 and P5 of the shift drum 90 by the third shifter 83 and the first shifter 81 guided by the third cam groove 93 and the first cam groove 91. In the same manner, the third speed gear step and the fourth speed gear step of the third speed gear step to the fifth speed gear step as the three consecutive gear steps from the low speed side are selected in the adjacent two predetermined rotation positions P4 and P5 and the adjacent two predetermined rotation positions P5 and P6 of the shift drum 90 by the first shifter 81 and the third shifter 83 guided by the first cam groove 91 and the third cam groove 83.

Shifting between the third speed gear step and the second speed gear step and the fourth speed gear step interposing the third speed gear step therebetween is done by shifting the first shift clutch 41 and the second shift clutch 42. In the same manner, shifting between the fourth speed gear step and the third speed gear step and the fifth speed gear step interposing the fourth speed gear step therebetween is done by shifting the first shift clutch 41 and the second shift clutch 42. As a result, the first shift clutch 41 and the second shift clutch 42 are shifted without rotating the shift drum 90 at shifting to be shifted to the adjacent gear steps. Smooth acceleration and deceleration and shifting with a small shock can be done to improve the ride comfort.

Of the centrifugal clutch C having a relatively large diameter, the first shift clutch 41, the second shift clutch 42, and the driven gear 26, the start clutch required to be maintained at a relatively high frequency, that is, the centrifugal clutch C is arranged in the forefront position in the front housing 12 or in the closest position to the front cover 10 in the axial direction, The maintenance operation becomes easy.

The clutches of the same construction are used for the first shift clutch 41 and the second shift clutch 42 for reducing the cost. The damper is incorporated into the driven gear 26. The driven gear 26, the clutch outers 60 of both the shift clutches 41 and 42, and the damper are rotated together regardless of the intermittent state of the first shift clutch 41 and the second shift clutch 42. The driven gear 26, the clutch outers 60 of both the shift clutches 41 and 42, and the damper are integrated. The vehicle power transmission system can be compact and lightweight.

Modified constructions of an embodiment which has modified some constructions of the above-described embodiment will be described below.

For example, the internal combustion engine may be a multi-cylinder internal combustion engine. The engine may be an internal combustion engine or a prime mover other than the internal combustion engine having a reciprocating piston. Also, the guiding parts of the shift drum may be guiding parts, e.g., convex threads other than the cam grooves. Further, the selection means may be of a manual type one rotatably driven by the direct operation of the rider.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular power transmission system comprising:
   a transmission, the transmission having a first shifting part and a second shifting part which shift a power of an engine;
   a first shift clutch transmitting and interrupting the power to the first shifting part; and
   a second shift clutch transmitting and interrupting the power to the second shifting part, in which the first shift clutch and the second shift clutch shift gear steps of the first shifting part and gear steps of the second shifting part,
   the vehicular power transmission system further comprising:
   a start clutch transmitting and interrupting the power to the first shift clutch and the second shift clutch, the start clutch being a centrifugal clutch having a centrifugal weight controlling an intermittent state by a centrifugal force in accordance with an engine rotational speed,
   wherein a driven gear of the transmission mechanism transmitting the power from the centrifugal clutch to the first shift clutch and the second shift clutch is arranged between the first shift clutch and the second shift clutch in an axial direction,
   wherein the first shift clutch and the second shift clutch are constructed of hydraulic clutches having hydraulic chambers and are arranged back to back so that the hydraulic chamber of the first shift clutch and the hydraulic chamber of the second shift clutch are close to each other in the axial direction, and
   wherein the first shift clutch is disposed in a position that is directly adjacent to the centrifugal clutch.

2. The vehicular power transmission system according to claim 1, wherein the centrifugal clutch is disposed on an output shaft of the engine, the first shift clutch and the second shift clutch are disposed on an input shaft of the transmission arranged in parallel with the output shaft, and the first shift clutch and the second shift clutch are arranged in positions overlapped with the centrifugal clutch, seen in an axial direction of the input shaft.

3. The vehicular power transmission system according to claim 2, wherein the first shift clutch and the second shift clutch are arranged between a housing rotatably supporting the input shaft and the centrifugal clutch in the axial direction.

4. The vehicular power transmission system according to claim 3, wherein the housing is a front case half body.

5. The vehicular power transmission system according to claim 1, wherein the centrifugal clutch is disposed so as to not overlap an input shaft when seen in an axial direction of the input shaft.

6. The vehicular power transmission system according to claim 2, wherein the centrifugal clutch is disposed so as to not overlap the input shaft when seen in the axial direction of the input shaft.

7. The vehicular power transmission system according to claim 3, wherein the centrifugal clutch is disposed so as to not overlap the input shaft when seen in the axial direction of the input shaft.

8. A vehicular power transmission system comprising:
   a transmission having a first gear train and a second gear train which shift a power of an engine;
   a first shift clutch transmitting and interrupting the power to the first gear train; and
   a second shift clutch transmitting and interrupting the power to the second gear train, in which the first shift clutch and the second shift clutch shift gear steps of the first gear train and gear steps of the second gear train,
   the vehicular power transmission system further comprising:
   a start clutch transmitting and interrupting the power to the first shift clutch and the second shift clutch, the start clutch being a centrifugal clutch having a centrifugal weight controlling an intermittent state by a centrifugal force in accordance with an engine rotational speed,
   wherein a driven gear of the transmission mechanism transmitting the power from the centrifugal clutch to the first shift clutch and the second shift clutch is arranged between the first shift clutch and the second shift clutch in an axial direction,
   wherein the first shift clutch and the second shift clutch are constructed of hydraulic clutches having hydraulic chambers and are arranged back to back so that the hydraulic chamber of the first shift clutch and the hydraulic chamber of the second shift clutch are close to each other in the axial direction, and
   wherein the first shift clutch is disposed in a position that is directly adjacent to the centrifugal clutch.

9. The vehicular power transmission system according to claim 8, wherein the centrifugal clutch is disposed on an output shaft of the engine, the first shift clutch and the second shift clutch are disposed on an input shaft of the transmission arranged in parallel with the output shaft, and the first shift clutch and the second shift clutch are arranged in positions overlapped with the centrifugal clutch, seen in an axial direction of the input shaft.

10. The vehicular power transmission system according to claim 9, wherein the first shift clutch and the second shift clutch are arranged between a front case half body rotatably supporting the input shaft and the centrifugal clutch in the axial direction.

11. The vehicular power transmission system according to claim 8, wherein the centrifugal clutch is disposed so as to not overlap an input shaft when seen in an axial direction of the input shaft.

12. A vehicular power transmission system comprising:
   a transmission having a first gear train and a second gear train which shift a power of an engine;
   a first shift clutch transmitting and interrupting the power to the first gear train; and
   a second shift clutch transmitting and interrupting the power to the second gear train, in which the first shift clutch and the second shift clutch shift gear steps of the first gear train and gear steps of the second gear train,
   the vehicular power transmission system further comprising:
   a start clutch transmitting and interrupting the power to the first shift clutch and the second shift clutch, the start clutch being a centrifugal clutch and having a centrifugal weight controlling an inteimittent state by a centrifugal force in accordance with an engine rotational speed, the start clutch being mounted on a crankshaft and the first and second shift clutches being mounted on a main shaft, wherein a driven gear of the transmission mechanism transmitting the power from the centrifugal clutch to the first shift clutch and the second shift clutch is arranged between the first shift clutch and the second shift clutch in an axial direction, wherein the first shift clutch and the second shift clutch are constructed of hydraulic clutches having hydraulic chambers and are arranged back to back so that the hydraulic chamber of the first shift clutch and the hydraulic chamber of the second shift clutch are close to each other in the axial direction, and wherein the first shift clutch is disposed in a position that is directly adjacent to the centrifugal clutch.

13. The vehicular power transmission system according to claim 12, wherein the first shift clutch and the second shift clutch are arranged between a front case half body rotatably supporting the main shaft and the centrifugal clutch in the axial direction, wherein the centrifugal clutch is disposed so as to not overlap an input shaft when seen in an axial direction of the input shaft.

* * * * *